United States Patent
Bellert et al.

(10) Patent No.: US 8,526,036 B2
(45) Date of Patent: Sep. 3, 2013

(54) SYSTEMS AND METHODS FOR PRINT RESOURCE MANAGEMENT

(75) Inventors: Darrell Eugene Bellert, Boulder, CO (US); Eduard G. Bauboeck, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 857 days.

(21) Appl. No.: 12/016,067

(22) Filed: Jan. 17, 2008

(65) Prior Publication Data

US 2009/0185214 A1    Jul. 23, 2009

(51) Int. Cl.
*G06K 15/00* (2006.01)
*G06K 3/12* (2006.01)
*G06F 3/12* (2006.01)
*G06F 15/00* (2006.01)
*G06F 17/00* (2006.01)
*G01R 31/08* (2006.01)
*G03G 15/00* (2006.01)

(52) U.S. Cl.
USPC ......... 358/1.15; 358/1.18; 358/1.9; 358/1.13; 358/1.16; 370/225; 399/18; 715/246; 715/251

(58) Field of Classification Search
USPC .............. 358/1.14, 448, 1.12, 1.16; 715/251, 715/531; 379/219
See application file for complete search history.

(56) References Cited

U.S. PATENT DOCUMENTS

| | | | | |
|---|---|---|---|---|
| 5,129,049 A | * | 7/1992 | Cuzzo et al. | 358/1.14 |
| 5,369,570 A | * | 11/1994 | Parad | 705/7.13 |
| 5,870,464 A | * | 2/1999 | Brewster et al. | 379/219 |
| 5,923,013 A | * | 7/1999 | Suzuki et al. | 235/375 |
| 5,963,968 A | * | 10/1999 | Warmus et al. | 715/246 |
| 6,204,935 B1 | * | 3/2001 | Soma et al. | 358/448 |
| 6,330,071 B1 | * | 12/2001 | Vidyanand | 358/1.15 |
| 6,836,568 B1 | * | 12/2004 | Morishita | 382/219 |
| 6,919,967 B1 | * | 7/2005 | Pentecost et al. | 358/1.15 |
| 6,952,801 B2 | * | 10/2005 | Warmus et al. | 715/251 |

(Continued)

FOREIGN PATENT DOCUMENTS

| | | |
|---|---|---|
| JP | 9-91149 | 4/1997 |
| JP | 2000-207150 | 7/2000 |

(Continued)

OTHER PUBLICATIONS

Notification of Reasons for Refusal mailed by the Japanese Patent Office on Jul. 3, 2012, in Japanese patent application No. 2009-006521.

(Continued)

*Primary Examiner* — Akwasi M Sarpong
(74) *Attorney, Agent, or Firm* — Finnegan, Henderson, Farabow, Garrett & Dunner, L.L.P.

(57) ABSTRACT

Systems and methods consistent with some embodiments presented provide methods for print resource management. In some embodiments of methods for print resource management print data comprising PDL data may be parsed to identify reusable resources in the print data. The reusable resources may be converted to a common internal format and stored. In some embodiments, reusable resources may be rendered to obtain a rendered version of the reusable resource, which may be stored. In some embodiments, the stored rendered version or a rendered form of the stored formatted version of the reusable resource may be used in a bitmap image for a page whenever the reusable resource is referenced during the creation of the bitmap image for the page.

27 Claims, 4 Drawing Sheets

(56) References Cited

U.S. PATENT DOCUMENTS

| | | | |
|---|---|---|---|
| 7,106,469 B2* | 9/2006 | Simpson et al. | 358/1.15 |
| 7,246,128 B2* | 7/2007 | Jordahl | 1/1 |
| 7,315,396 B2* | 1/2008 | Bergstrand et al. | 358/1.9 |
| 7,327,487 B2* | 2/2008 | Prosi | 358/1.16 |
| 7,330,425 B1* | 2/2008 | Gulati et al. | 370/225 |
| 7,643,162 B2* | 1/2010 | Sojian et al. | 358/1.13 |
| 7,839,511 B2* | 11/2010 | La Rosa Ducato et al. | 358/1.13 |
| 7,860,411 B2* | 12/2010 | Toda | 399/18 |
| 8,074,223 B2* | 12/2011 | Birkestrand | 718/104 |
| 2002/0080388 A1* | 6/2002 | Chrisop et al. | 358/1.15 |
| 2002/0097419 A1* | 7/2002 | Chang et al. | 358/1.13 |
| 2002/0097433 A1* | 7/2002 | Chang et al. | 358/1.15 |
| 2003/0030837 A1* | 2/2003 | Simpson et al. | 358/1.15 |
| 2003/0076535 A1* | 4/2003 | Prosi | 358/1.16 |
| 2004/0098410 A1* | 5/2004 | Ozawa | 707/104.1 |
| 2005/0044494 A1* | 2/2005 | Barnes et al. | 715/531 |
| 2005/0111044 A1* | 5/2005 | Giannetti | 358/1.18 |

FOREIGN PATENT DOCUMENTS

| | | |
|---|---|---|
| JP | 2004-192390 | 7/2004 |
| JP | 2005-210395 | 8/2005 |
| JP | 2006-237825 | 9/2006 |
| JP | 2006-243816 | 9/2006 |
| JP | 2007-83556 | 4/2007 |

OTHER PUBLICATIONS

PPML (Personalized Print Markup Language) from Wikipedia, http://en.wikioedia.org/wiki/Ppml, accessed online Sep. 17, 2007, 3 pages.

PPML Overview, the New World Standard, http://www.ppml.info/general/overview.html, accessed online Sep. 17, 2007, 3 pages.

Citation Software Inc.—FAQ—What is PPML?, http://www.citationsoftware.com/faqPPML.htm, accessed online Sep. 17, 2007, 6 pages.

* cited by examiner

US 8,526,036 B2

SYSTEMS AND METHODS FOR PRINT RESOURCE MANAGEMENT

BACKGROUND

1. Field of the Invention

The present invention relates to the field of printing and in particular, to systems and methods to manage resources in page description languages.

2. Description of Related Art

Document processing software allows users to view, edit, process, and store documents conveniently. Pages in a document may be displayed on screen exactly as they would appear in print. However, before the document can be printed, pages in the document are often described in a page description language ("PDL"). As used in this application PDLs may include PostScript, Adobe PDF, HP PCL, Microsoft XPS, and variants thereof as well as any other languages used to describe pages in a document. A PDL description of a document provides a high-level description of each page in a document. This PDL description is often translated to a series of lower-level printer-specific commands when the document is being printed. The translation process from PDL to lower-level printer-specific commands may be complex and depend on the features and capabilities offered by a particular printer. The process of translation from a PDL description of a document to a lower-level description that may be used to place marks on a print medium is termed rasterization.

In one aspect, print jobs may be thought of as being of two broad types. In the first type, termed non-variable-data print jobs, code for text elements and graphic elements on a page may be sent to the printer and rasterized by the printer once. The printer can then print as many copies as specified. In non-variable data print jobs, rasterization occurs once even when many copies are printed because each copy is identical.

In the second type, termed variable-data print jobs, code for text and graphic elements on a page may be sent to the printer each time that a customized version of that page is printed. Rasterization may need to occur for each copy printed because the copies may be non-identical because of customization even though the content of large sections of each copy may overlap. Thus, variable data print jobs can take substantially longer to print.

PDL's include a class of languages governed by the Personal Printer Markup Language ("PPML") specification, which permits printer languages to identify, store, and re-use text and graphic elements. A PPML-compliant language can speed up the printing of variable data print jobs by permitting the storage and re-use of text and graphic elements thus reducing rasterization and bandwidth overheads. PPML-compliant languages allow printers to manipulate data components at the object level instead of at the page level. In other words, by lowering the granularity of the information stored by a printer to the object-level, PPML-compliant languages allow code to attach names to objects and re-use the objects as needed during the process of printing a variable-data job. Re-useable objects are also often called resources in PPML.

Historically, as PDLs emerged over time, various and disparate techniques evolved to handle similar objects in different PDLs. For example, a printer may employ one technique to optimize reused objects in one PDL and a different technique to handle reused objects in a different PDL. Thus, there is a need for more general-purpose schemes to efficiently process PDL descriptions of documents to printer-specific commands and eliminate the complexities associated with traditional PDL processing.

SUMMARY

In accordance with the present invention, systems and methods for print resource management are presented. In some embodiments, a method for processing print data, wherein the print data comprises PDL data, the method comprises parsing the print data to identify at least one reusable resource in the print data; transforming the identified reusable resource into at least one of several internal formats determined by analyzing at least one characteristic of the reusable resource, wherein the internal formats are common to a plurality of PDL data types; storing the formatted reusable resource; and using a rendered version of the stored formatted reusable resource to create a bitmap image for a page whenever the reusable resource is referenced during the creation of the bitmap image for the page.

Embodiments of the present invention also relate to instructions created, stored, accessed, or modified by processors using computer-readable media and/or computer-readable memory.

These and other embodiments are further explained below with respect to the following figures.

DETAILED DESCRIPTION

In accordance with embodiments reflecting various features of the present invention, systems and methods for the automatic storing, manipulating, and processing of a second or intermediate form of printable data generated from a first printable data are presented. In some embodiments, the first printable data may take the form of a PDL description of a document and the intermediate printable data may take the form of a display list of objects generated from the PDL description.

Figure 1:
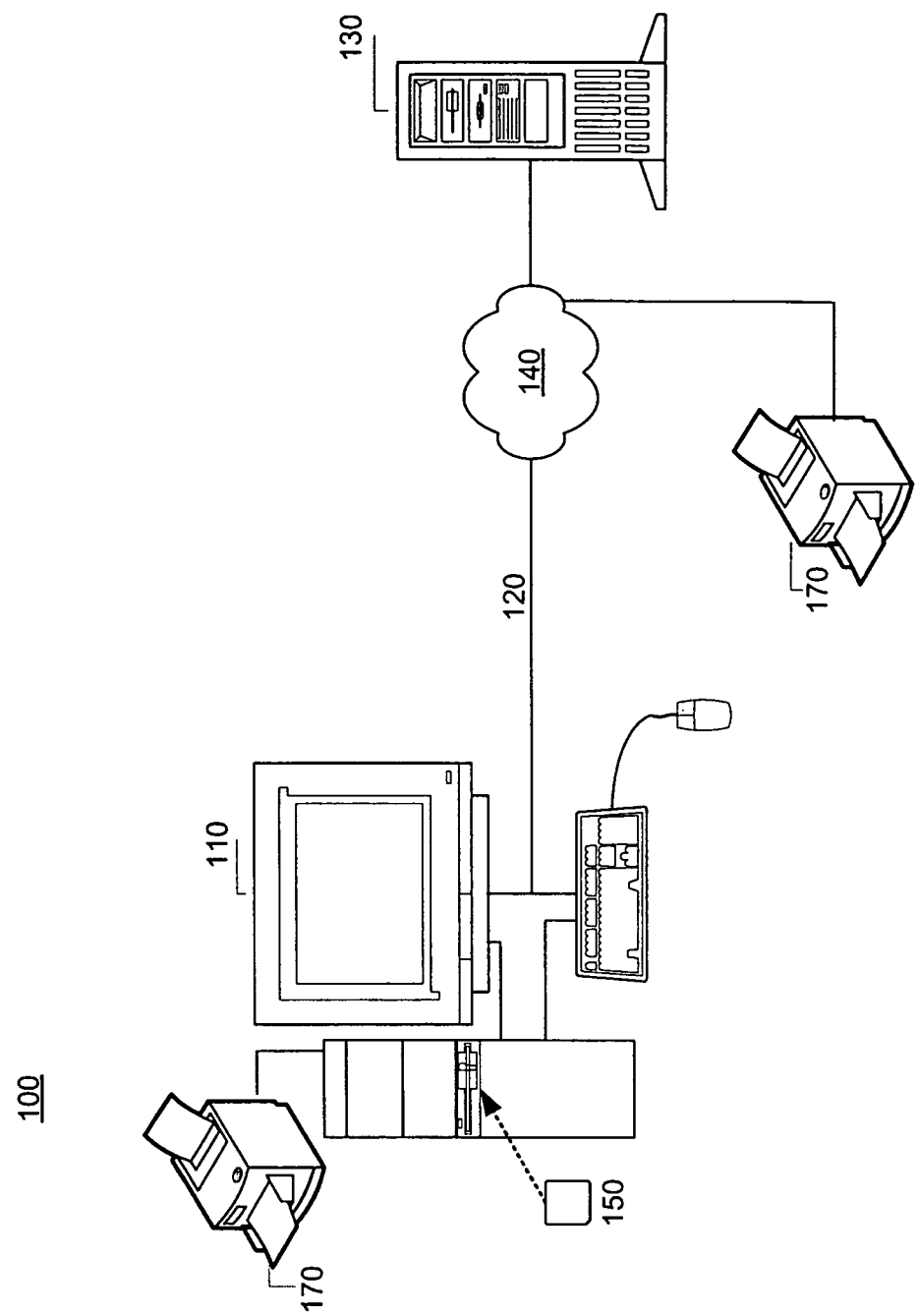
FIG. 1 shows a block diagram illustrating components in a system for printing documents.

FIG. 1 shows a block diagram illustrating components in a system for printing documents according to some embodiments of the present invention. A computer software application consistent with the present invention may be deployed on a network of computers, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Exemplary printer 170 includes devices that produce physical documents from electronic data including, but not limited to, laser printers, ink-jet printers, LED printers, plotters, facsimile machines, and digital copiers. In some embodiments, printer 170 may also be capable of directly printing documents received from computing device 110 or server 130 over connection 120. In some embodiments such an arrangement may allow for the direct printing of documents, with (or without) additional processing by computing device 110 or server 130. In some embodiments, documents may contain one or more of text, graphics, and images. In some embodiments, printer 170 may receive PDL or PPML descriptions of documents for printing. Note, too, that document print processing can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. In some embodiments, portions of the software application may reside on removable media and be read and executed by computing device 110 using removable media drive 150.

Connection 120 couples computing device 110, server 130, and printer 170 and may be implemented as a wired or wireless connection using conventional communication protocols and/or data port interfaces. In general, connections 120 can be any communication channel that allows transmission of data between the devices. In one embodiment, for example, the devices may be provided with conventional data ports, such as parallel ports, serial ports, Ethernet, USB, SCSI, FIREWIRE, and/or coaxial cable ports for transmission of data through the appropriate connection. In some embodiments, connection 120 may be a Digital Subscriber Line (DSL), an Asymmetric Digital Subscriber Line (ADSL), or a cable connection. The communication links could be wireless links or wired links or any combination consistent with embodiments of the present invention that allows communication between the various devices.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. In some embodiments, printer 170 may also be connected directly to computing device 110 and/or server 130. System 100 may also include other peripheral devices (not shown), according to some embodiments of the present invention. A computer software application consistent with the present invention may be deployed on any of the exemplary computers, as shown in FIG. 1. For example, computing device 110 could execute software that may be downloaded directly from server 130. Portions of the application may also be executed by printer 170 in accordance with some embodiments of the present invention.

Figure 2:
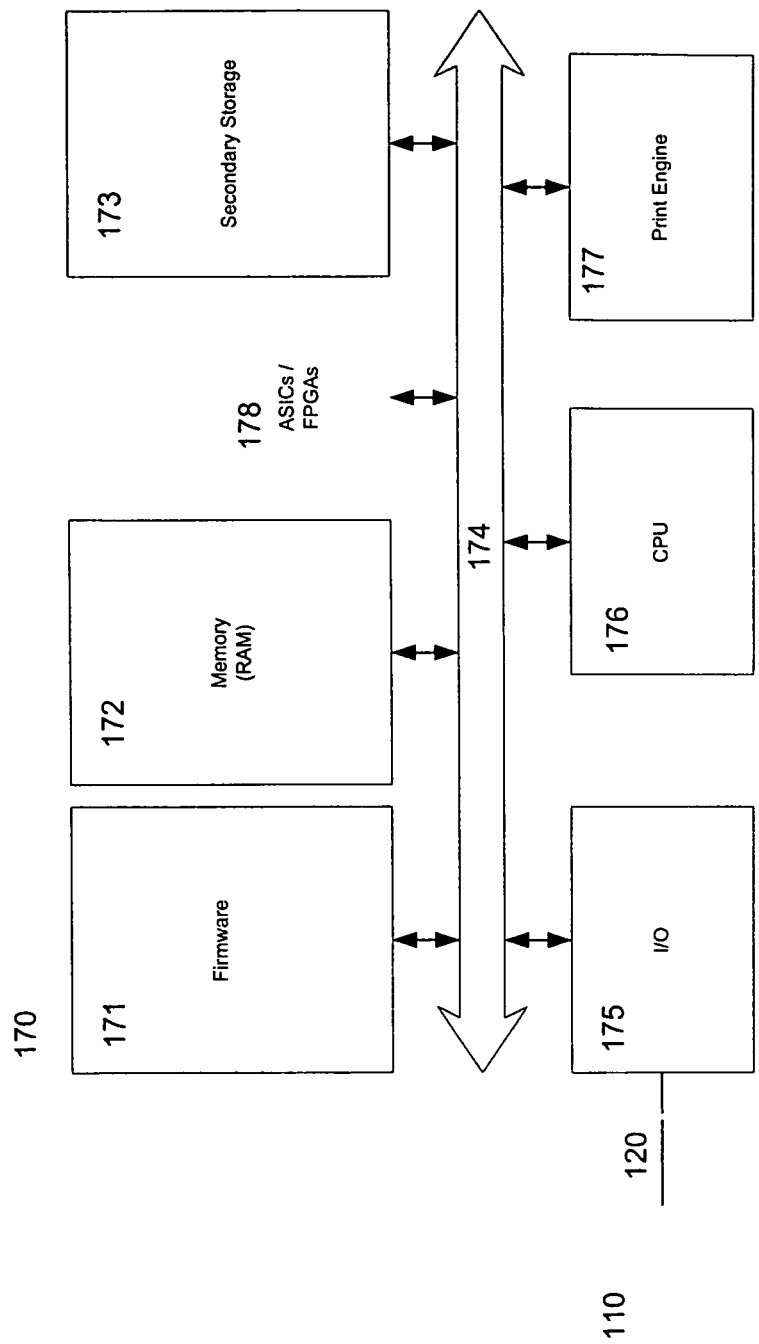
FIG. 2 shows a high level block diagram of an exemplary printer.

FIG. 2 shows a high-level block diagram of exemplary printer 170. In some embodiments, printer 170 may contain bus 174 that couples CPU 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to print documents according to some embodiments of the present invention. In some embodiments, printer 170 may also be able to access secondary storage or other memory in computing device 110 using I/O ports 175 and connection 120. In some embodiments, printer 170 may also be capable of executing software including a printer operating system and other appropriate application software. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines, and other code. In some embodiments, code and data in firmware 171 may be copied to memory 172 prior to being acted upon by CPU 176. Routines in firmware 171 may include code to translate page descriptions received from computing device 110 to display lists and image bands. In some embodiments, firmware 171 may include rasterization routines to convert display commands in a display list to an appropriate rasterized bit map and store the bit map in memory 172. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. FPGAs/ASICs 178 may also implement one or more of translation, compression, and rasterization algorithms. In some embodiments, computing device 110 can transform document data into a first printable data. Then, the first printable data can be sent to printer 170 for transformation into intermediate printable data. Printer 170 may transform intermediate printable data into a final form of printable data and print according to this final form. In some embodiments, the first printable data may correspond to a PDL or PPML description of a document. In some embodiments, the translation process from a PDL or PPML description of a document to the final printable data comprising of a series of lower-level printer-specific commands may include the generation of intermediate printable data comprising of display lists of objects. In some embodiments, display lists may hold one or more of text, graphics, command, and image data objects. In some embodiments, objects in display lists may correspond to similar objects in a user document. In some embodiments, display lists may aid in the generation of intermediate printable data. In some embodiments, display lists may be stored in memory 172 or secondary storage 173. Exemplary secondary storage 173 may be an internal or external hard disk, memory stick, or any other memory storage device capable of being used system 200. In some embodiments, the display list may reside in one or more of printer 170, computing device 110, and server 130. Memory to store display lists may be a dedicated memory or form part of general purpose memory, or some combination thereof according to some embodiments of the present invention. In some embodiments, memory may be dynamically allocated to hold display lists as needed. In some embodiments, memory allocated to store display lists may be dynamically released after processing.

Figure 3:
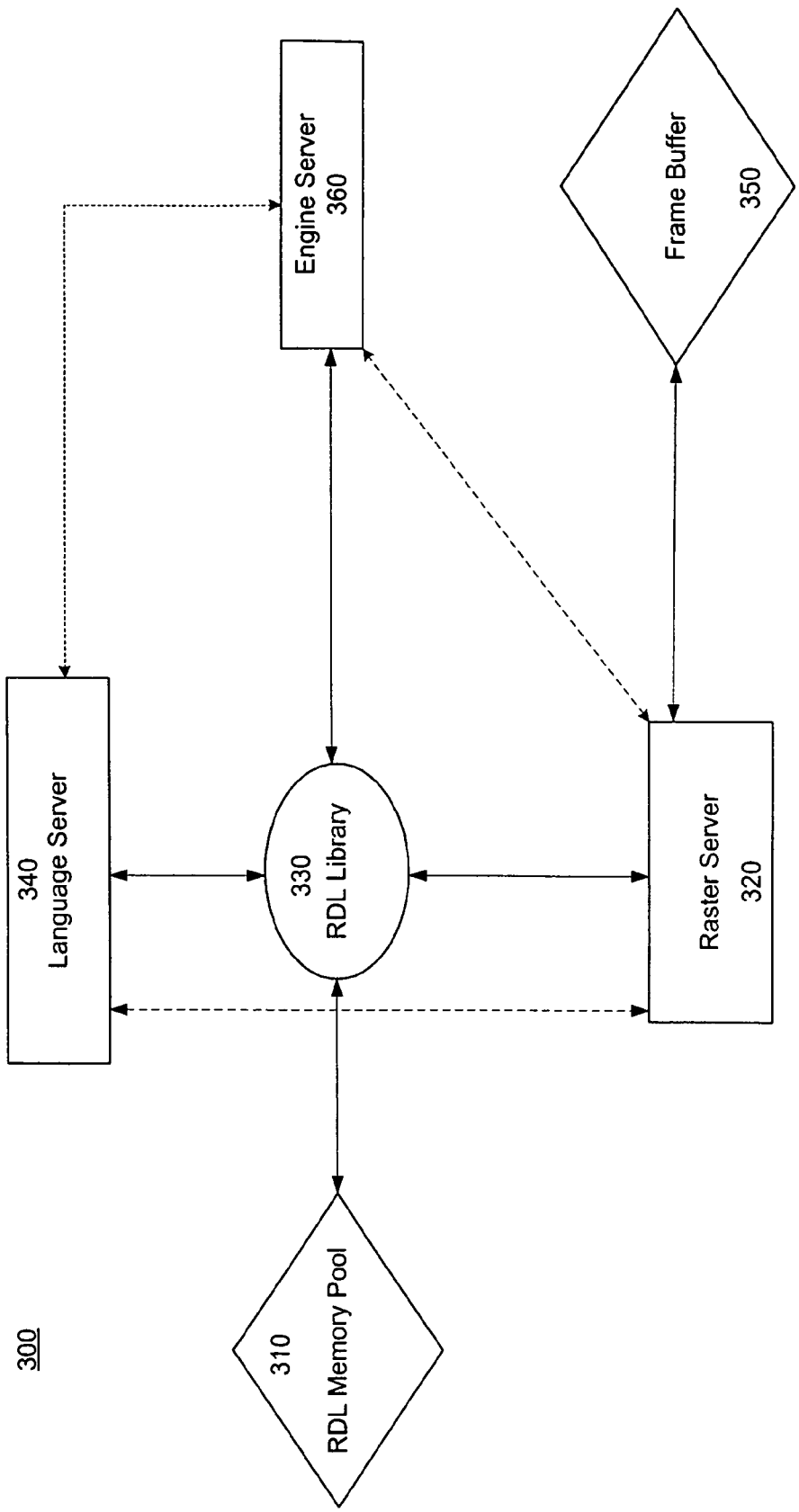
FIG. 3 shows an exemplary high-level architecture of a system for creating and processing display lists generated from PDLs.

FIG. 3 shows an exemplary high-level architecture of a system for creating and processing display lists generated from PDLs. As shown in FIG. 3, language server 340, engine server 360, and raster server 320 may communicate with each other. In addition, language server 340, engine server 360, and raster server 320 may invoke routines and communicate with RDL library 330. In some embodiments, the display list may include commands defining data objects and their contexts within a document or a page within the document to be printed. These display commands may include data comprising characters or text, line drawings or vectors, and images or raster data.

In some embodiments, the display list may be dynamically reconfigurable and is termed a Reconfigurable Display List ("RDL"). In some embodiments, an RDL may be implemented using a data structure that allows certain display list objects to be stored in a manner that allows their manipulation dynamically. For example, image objects may be compressed in place to increase the amount of available memory, and decompressed when referenced and/or used. In some embodiments, an RDL may also permit RDL objects to be stored in memory and/or secondary storage by holding pointers, offsets, or addresses to the actual locations of RDL objects, which can then be retrieved when referenced and/or used. In general, the RDL allows display list objects to be flexibly stored and manipulated based on system constraints and parameters.

In some embodiments the translation of a PDL description of a document into a display list representation may be performed by language server 340 using routines in RDL library 330. In some embodiments, language server 340 may take PDL language primitives and transform these into data and graphical objects and add these to the display list using the capability provided by functions in RDL library 330. In some embodiments, access to functions and routines in RDL library 330 may be provided through an Application Programming Interface ("API"). In some embodiments, the display list may be stored and manipulated in a dynamically allocated memory pool such as exemplary RDL memory pool 320. In some embodiments, the display list may be a second or intermediate step in the processing of data prior to actual printing and may be parsed before conversion into a subsequent form. In some embodiments the subsequent form may be a final representation, and the conversion process may be referred to as rasterizing the data. In some embodiments rasterization may be performed by raster server 320. Upon rasterization, the rasterized data may be stored in frame buffer 350, which may be part of memory 172. In some embodiments, the rasterized data may take the form of a bitmap that specifies the marks to be made on a printed page. Print engine 177, may process the rasterized data in frame buffer 350, and form a printable image of the page on a print medium, such as paper. In some embodiments, raster server 320 and engine server 360 may also use routines in RDL library 330 to perform their functions. In some embodiments, engine server 360 may provide control information, instructions, and data to print engine 177. In some embodiments, engine server 360 may free memory used by display list objects after processing for return to RDL memory pool 320. In some embodiments, portions of RDL memory pool and/or frame buffer 350 may reside in memory 172 or secondary storage 173. In some embodiments, routines for language server 340, raster server 320, and engine server 360 may be provided in firmware 171 or may be implemented using ASICs/FPGAs 178.

Figure 4:
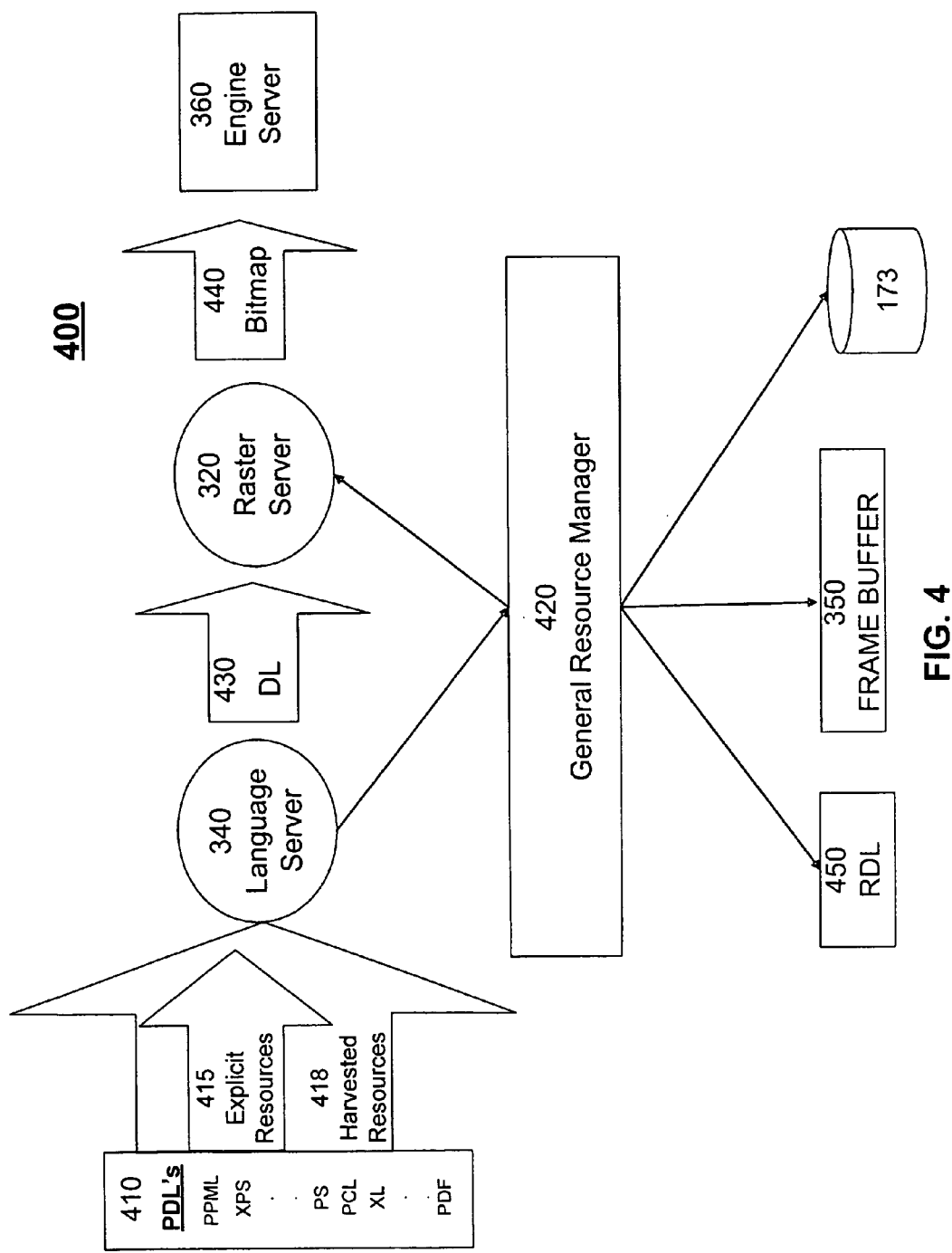
FIG. 4 shows interaction between various components in an exemplary system for PDL resource management.

FIG. 4 shows interaction between various components in an exemplary system 400 or PDL resource management. In some embodiments, PDL data 410 may include one or more of PPMLs, PCL, XPS, PS, and/or various other types of PDL data. As shown in FIG. 4, information contained in exemplary PDL data 410 may comprise of both Explicit Resources 415 and Harvested Resources 418. In some embodiments, PDL data 410 may be processed by Language Server 340. In some embodiments, processing may include inspection of header information in PDL files to determine the data type of PDL data contained in the file. Routines in RDL library 330 may be used to process the information contained in PDL data 410.

In some embodiments, the identification of reusable resources may be PDL language specific and may be performed by a preprocessing front-end prior to processing by language server 340. In some embodiments, the preprocessing front-end may use routines in RDL library 330 that are specific to a language to parse the PDL file and identify reusable resources. Exemplary language server 340 may then process all reusable resources identified by the preprocessing front-end using PDL language-independent routines. The identified reusable resources may be processed using standard routines available to generally process such resources. Accordingly, after operations by the preprocessing front-end, language server 340 may be able to perform its functions in a language-independent manner using a common code pathway that is shared across multiple PDLs.

In some embodiments, the use of a common code pathway allows language server 340 to make use of general optimizations for print processing based on internal representations of reusable resources rather than a multiplicity of routines that are written for a multiplicity of PDLs. In some embodiments, the internal representations or internal formats may be common to reusable resources across a multiplicity of PDLs. In some embodiments, the internal formats may include one or more data fields in a data structure associated with a reusable resource. In some embodiments, the data structure may correspond to a display list or a reconfigurable display list and the data field to a DL or RDL object. In one embodiment, a rendered bitmap image may be associated with a data field in a data structure associated with a reusable resource. In one embodiment, a data field may directly hold the internal formatted version corresponding to a reusable resource. In another embodiment, a data field may reference the internal formatted version corresponding to a reusable resource using a variety of mechanisms such as pointers, linked lists etc.

In some embodiments, object level data that is capable of being re-used during the rasterization process may be identified as resources for General Resource Manager 420. In some embodiments, if the resources are explicitly identified such as in PPML-compliant languages they may be identified as explicit resources 415. For example, Explicit Resources 415 may comprise of those objects that are explicitly identified as re-usable in PPML-compliant languages. Identification may comprise the generation and assignment of a unique ID to the resource. In some embodiments, a Global Unique Identifier ("GUID") may be used to assign unique identifiers to the resources. In some embodiments, a further parsing of PDL data 410 may yield harvested resources 418 that are capable of being re-used that are specific to a PDL. Harvested resources 418 constitute those re-useable objects that are not explicitly identified, but which may be identified as resources by parsing PDL data 410 in a manner consistent with embodiments disclosed herein. For example, consider the following code sequence in PDL data 410, where the data comprises PostScript ("PS") data:

```
%!ps
[5 1 1 1] 0 setdash
0.8 0.8 0 0 setcmykcolor
10 570 moveto
200 0 rline
0 200 rlineto
−200 0 rlineto
closepath
stroke
showpage
```

In the example above, the "setdash" command can be interpreted to mean that this stroke will be composed of a series of dot-dashes, which will be repeated for the whole path. The "setdash" command may be identified as harvested resource 418 to general resource manager 420. Once identified, general resource manager 420 can create a GUID for the command, so that the dot-dash may be rendered once, or stored in DL form, based on optimality considerations and then reused wherever the dot-dash is printed.

In some embodiments, general resource manager 420 can maintain a table or another data structure that may be used to track resources currently in the system. GUIDs assigned to resources may be used to track whether a particular resource has been rendered. That is, the table keeps track of whether the resource is represented as display list 430 (not rendered) or as a bitmap 440 (rendered). Exemplary language server 340 may process explicit resources 415 and harvested resources 418 and may store objects generated during processing in display list ("DL") 430 and/or reconfigurable display list ("RDL") 450. In some embodiments, resources or objects that can be re-used may be stored in RDL 450 using resource manager 420. DL 430 and RDL 450 can be processed by raster server 320 to create bitmap 440.

General resource manager 420 may determine which form, bitmap 440 or RDL 450, is optimal for the particular resource. For example, dense resources covering a small area may be kept in bitmap form whereas non-dense resources covering a large area may be kept in RDL form. In some embodiments, general resource manager 420 may use information about the physical bounds of a resource and an estimate of the physical bounds for each object in a display list for the resource to estimate the density of the resource in total. For example, general resource manager 420 may identify a resource that spans 100 pixels×100 pixels as low density and may store the resource in display list form, if the sole object in the display list for the only marks about 140 pixels. On the other hand, general resource manager 420 may identify a resource that spans 100 pixels×100 pixels as high density and may store the resource in bitmap form, if there are many objects in the display list for the resource and in total they mark more than 10000 pixels (which can occur if some objects overlap physically with other objects). In general, general resource manager 420 may use one or more criteria, including device specific criteria, to determine the format for storing a resource.

When a re-usable object is rendered, general resource manager 420 may mark the resource as rendered. In some embodiments, re-usable rendered objects may be stored in frame buffer 350 by general resource manager 420. In another embodiment, a rendered re-usable object may be stored on secondary storage 173, if there is no memory available in frame buffer 350. For example, if the time to copy a re-usable object from secondary storage into the frame buffer is less than the time to render the object then the object may be stored in secondary storage. In some embodiments, re-useable objects may be cached. In another embodiment, resources may be sent to printer 172 in the form of a Uniform Resource Locator ("URL"). If the resource has already been cached printer 172 may use the cached resource. Otherwise, the URL may be used to retrieve the resource.

Some PPML's permit the use of reusable objects across page boundaries. For example, Reusable Objects in PPML and Resource Elements in XPS can be used across page boundaries. In one embodiment, Generalized Resource Manager 420 may also allow for resources to be stored and reused in a context that spans more than a page. In some embodiments, the storing and reuse of objects across page boundaries eliminates the need to re-create reusable objects when they are encountered in later pages. In some embodiments, Generalized Resource Manager 420 may use data structures to facilitate processing of resources valid within one page and those resources that have wider scope. Resources that are need within a page are often called "temporary resources" because they are needed only while a page is being created. In some embodiments, Generalized Resource Manager 420 may use data elements, within a data structure to implement RDL 450, that are routinely used in the context of the current page. For example, a registry for the current page may be used to keep track of temporary resources and temporary resources may be registered with this registry when they are identified.

In some embodiments, resources with a wider scope than a page may be stored in a special resource data structure. For example, a resource may span several pages, a document, and/or a series of documents. Resources that span several pages, a document, or multiple documents are often categorized as "permanent resources." In one embodiment, a data structure to hold permanent resources may contain data such as font tables, halftone tables, as well as objects in the display list and/or frame buffer. In some embodiments, a system wide registry may be used to keep track of permanent resources and permanent resources may be registered with this registry when they are identified.

For example, PPML provides functionality to create a series of reusable objects. In PPML, a page, or subsets of pages of a multi-page document can be defined as reusable object and can have multiple occurrences. In some embodiments, generalized resource manager 420 may allocate resources upon determination of their context to data elements within a data structure used in the context of the current page, or to data elements with the special resource data structure that is used across multiple pages. In some embodiments, the identification of temporary and permanent resources and their allocation to data elements within appropriate data structures and/or registration with appropriate registries may be performed by language server 340. Exemplary engine server 360 may process data in bitmap 440 for printing of the document.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method for processing print data performed by a printing system, wherein the print data comprises PDL data, the method comprising:

parsing the print data to identify at least one reusable resource in the print data, wherein the at least one reusable resource is referenced in print data more than once;

transforming, by a processor, the identified reusable resource into at least one of several internal formats determined by analyzing at least one characteristic of the reusable resource, wherein the internal formats are common to a plurality of PDL data types;

storing, in a storage medium, the formatted reusable resource; and using a rendered version of the stored formatted reusable resource to create a bitmap image for a page whenever the reusable resource is referenced during the creation of the bitmap image for the page, wherein transforming the identified reusable resource into at least one of several internal formats comprises associating the reusable resource with an instance of a data field in a data structure, wherein:

the data field instance persists for a page, if the reusable resource is temporary; and the data field instance persists across multiple pages, if the reusable resource is permanent and not temporary, and is used over multiple pages.

2. The method of claim 1, wherein the at least one reusable resource is identified by a global unique identifier.

3. A method for processing print data performed by a printing system, wherein the print data comprises PPML data, the method comprising:

parsing the print data to identify at least one reusable resource in the print data, wherein the at least one reusable resource is referenced in print data more than once;

transforming, by a processor, the identified reusable resource into at least one of several internal formats determined by analyzing at least one characteristic of the reusable resource, wherein the internal formats are common to a plurality of PDL data types;

storing, in a storage medium, the formatted reusable resource; and using a rendered version of the stored formatted reusable resource to create a bitmap image for a page whenever the reusable resource is referenced during the creation of the bitmap image for the page, wherein the identified at least one reusable resource comprises a first reusable resource that is an explicit reusable resource and a second reusable resource that is a harvested reusable resource and wherein the explicit reusable resource is explicitly identified as reusable in the PPML data and the harvested reusable resource is not explicitly identified as reusable in the PPML data but is identified as reusable by parsing the PPML data and is reused in print data.

4. The method of claim 1, wherein the data field instance persists across multiple documents, if the reusable resource is used over multiple documents.

5. The method of claim 4, wherein associating the reusable resource with an instance of a data field in a data structure further comprises:

generating a rendered form of a display list object corresponding to the reusable resource, if the time needed to render the display list object is more than a temporal threshold and the memory requirements of the rendered reusable resource exceed a space threshold.

6. The method of claim 5, wherein the temporal threshold equals a time needed to copy the rendered form from secondary storage into a frame buffer.

7. The method of claim 5, wherein the rendered version of the reusable resource is stored in secondary storage.

8. The method of claim 6, wherein the space threshold equals a memory available in a frame buffer.

9. The method of claim 1, wherein the identified reusable resource comprises one or more of:

text objects;
image objects; and
graphic objects.

10. The method of claim 1, wherein the parsing the print data to identify at least one reusable resource in the print data is performed by a pre-processing front end.

11. A non-transitory computer-readable medium for storing instructions, which when executed by a processor perform steps in a method for processing print data, wherein the print data comprises PDL data, the method comprising:

parsing the print data to identify at least one reusable resource in the print data, wherein the at least one reusable resource is referenced in print data more than once;

transforming the identified reusable resource into at least one of several internal formats determined by analyzing at least one characteristic of the reusable resource, wherein the internal formats are common to a plurality of PDL data types;

storing the formatted reusable resource; and using a rendered version of the stored formatted reusable resource to create a bitmap image for a page whenever the reusable resource is referenced during the creation of the bitmap image for the page, wherein transforming the identified reusable resource into at least one of several internal formats comprises associating the reusable resource with an instance of a data field in a data structure, wherein:

the data field instance persists for a page, if the reusable resource is temporary; and the data field instance persists across multiple pages, if the reusable resource is permanent and not temporary, and is used over multiple pages.

12. The computer-readable medium of claim 11, wherein the at least one reusable resource is identified by a global unique identifier.

13. A non-transitory computer-readable medium for storing instructions, which when executed by a processor perform steps in a method for processing print data, wherein the print data comprises PPML data, the method comprising:

parsing the print data to identify at least one reusable resource in the print data, wherein the at least one reusable resource is referenced in print data more than once;

transforming the identified reusable resource into at least one of several internal formats determined by analyzing at least one characteristic of the reusable resource, wherein the internal formats are common to a plurality of PDL data types;

storing the formatted reusable resource; and using a rendered version of the stored formatted reusable resource to create a bitmap image for a page whenever the reusable resource is referenced during the creation of the bitmap image for the page, wherein the identified at least one reusable resource comprises a first reusable resource that is an explicit reusable resource and a second reusable resource that is a harvested reusable resource, and wherein the explicit reusable resource is explicitly identified as reusable in the PPML data and the harvested reusable resource is not explicitly identified as reusable in the PPML data but is identified as reusable by parsing the PPML data and is reused in print data.

14. The computer-readable medium of claim 11, wherein the data field instance persists across multiple documents, if the reusable resource is used over multiple documents.

15. The computer-readable medium of claim 14, wherein associating the reusable resource with an instance of a data field in a data structure further comprises:

generating a rendered form of a display list object corresponding to the reusable resource, if the time needed to render the display list object is more than a temporal threshold and the memory requirements of the rendered reusable resource exceed a space threshold.

16. The computer-readable medium of claim 15, wherein the temporal threshold equals a time needed to copy the rendered form from secondary storage into a frame buffer.

17. The computer-readable medium of claim 16, wherein the space threshold equals a memory available in a frame buffer.

18. The computer-readable medium of claim 11, wherein the rendered version of the at least one identified reusable resource is stored in secondary storage.

19. The computer-readable medium of claim 11, wherein the parsing the print data to identify at least one reusable resource in the PDL data is performed by a pre-processing front end.

20. A printing system for processing print data including PDL data, the printing system comprising:
   a language server for parsing the print data to identify at least one reusable resource in the print data, wherein the at least one reusable resource is referenced in print data more than once;
   a processor for transforming the identified reusable resource into at least one of several internal formats determined by analyzing at least one characteristic of the reusable resource, wherein the internal formats are common to a plurality of PDL data types;
   a storage for storing the formatted reusable resource; and
   a raster server for using a rendered version of the stored formatted reusable resource to create a bitmap image for a page whenever the reusable resource is referenced during the creation of the bitmap image for the page,
   wherein the processor transforms the identified reusable resource into at least one of several internal formats by associating the reusable resource with an instance of a data field in a data structure, wherein:
      the data field instance persists for a page, if the reusable resource is temporary; and
      the data field instance persists across multiple pages, if the reusable resource is permanent and not temporary, and is used over multiple pages.

21. The printing system of claim 20, wherein the language server is further for identifying the at least one reusable resource from print data comprising one or more of explicit and harvested resources.

22. The printing system of claim 20, wherein the processor is further for:
   generating a rendered form of a display list object corresponding to the reusable resource if the time needed to render the display list object is more than a temporal threshold and the memory requirements of the rendered reusable resource exceed a space threshold.

23. The printing system of claim 22, wherein the temporal threshold equals a time needed to copy the rendered form from secondary storage into a frame buffer.

24. The printing system of claim 23, wherein the space threshold equals a memory available in a frame buffer 25. The printing system of claim 22, wherein the rendered version of the reusable resource is stored in secondary storage.

26. The method of claim 1, wherein the temporary reusable resource is registered with a registry for a current page and the permanent reusable resource is registered with a system wide registry.

27. The method of claim 1, further comprising storing a rendered version of the reusable resource in a secondary storage, if there is no memory available in a frame buffer and if the time to copy the reusable resource from the secondary storage to the frame buffer is less than the time to render the reusable resource.

* * * * *